United States Patent [19]

Meiser et al.

[11] 4,379,057
[45] Apr. 5, 1983

[54] METHOD FOR THE CYCLIC REGENERATION OF WATER-SOFTENING SYSTEMS AND PROGRAMMED WATER-SOFTENING SYSTEM FOR APPLYING THE METHOD

[75] Inventors: Ewald Meiser, Weisham; Horst Bauer, Erftstadt-Lechenich, both of Fed. Rep. of Germany

[73] Assignee: Gebrüder Heyl KG, Hildesheim, Fed. Rep. of Germany

[21] Appl. No.: 213,728

[22] Filed: Dec. 5, 1980

[30] Foreign Application Priority Data

Dec. 17, 1979 [DE] Fed. Rep. of Germany ....... 2950728

[51] Int. Cl.³ .............................................. C02F 1/42
[52] U.S. Cl. .................................... 210/662; 210/678;
  210/687; 210/86; 210/89; 210/96.1; 210/105;
  210/140; 210/141; 210/191
[58] Field of Search ............... 210/662, 670, 678, 687,
  210/96.1, 98, 190, 191, 269, 275, 105, 86, 89,
  140, 141; 521/26

[56] References Cited

U.S. PATENT DOCUMENTS

| 3,687,843 | 8/1972 | Emmett | 210/678 |
| 4,104,158 | 8/1978 | Davis | 210/105 |
| 4,237,538 | 12/1980 | Le Dall | 210/662 |
| 4,275,448 | 6/1981 | Le Dall | 210/662 |

FOREIGN PATENT DOCUMENTS

| 1642525 | 6/1971 | Fed. Rep. of Germany . |
| 1450222 | 9/1976 | United Kingdom . |

Primary Examiner—Ivars C. Cintins
Attorney, Agent, or Firm—Browdy and Neimark

[57] ABSTRACT

Ion exchange medium in a water softening system is regenerated cyclically, in response to both a preset timer and a metering device responsive to the degree of hardness of the untreated water and the degree of exhaustion of the ion exchange medium, by slowly feeding regenerating medium, prepared during the softening phase by the metering device, counter current to flow during softening at a rate so as not to disturb the exchange medium and to prevent substantial mixing of the regenerating medium with the water being displaced.

23 Claims, 6 Drawing Figures

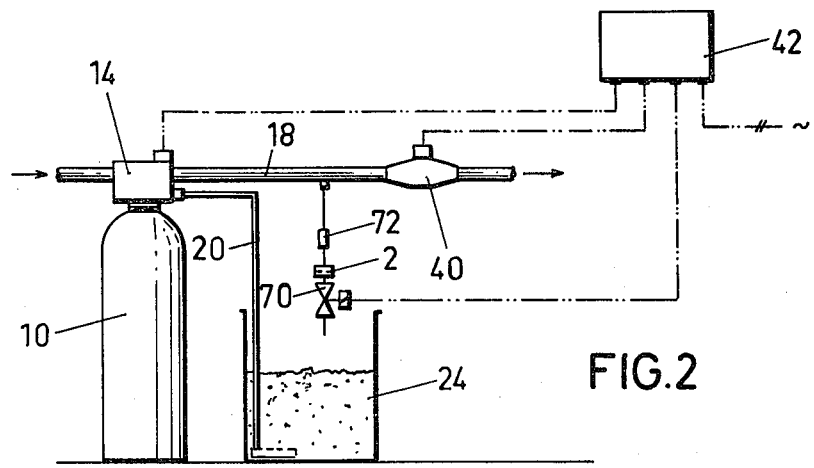
FIG.2
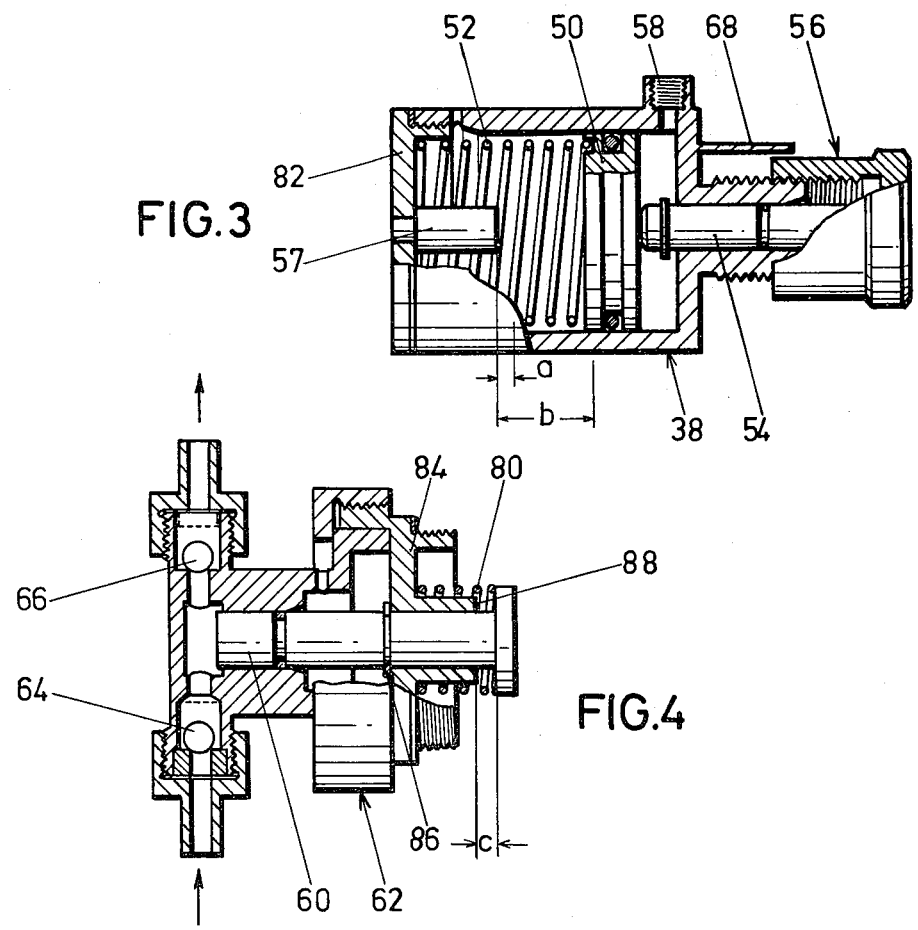
FIG.3
FIG.4

4,379,057

METHOD FOR THE CYCLIC REGENERATION OF WATER-SOFTENING SYSTEMS AND PROGRAMMED WATER-SOFTENING SYSTEM FOR APPLYING THE METHOD

FIELD OF THE INVENTION

The instant invention relates to the cyclic regeneration of water softening systems which include an exchange medium in a treatment container and a regeneration medium in a storage container, and in which first the regeneration medium is passed through the exchange medium from below in a direction opposite to the water treatment direction, then the exchange medium is slowly rinsed with treated water in the regeneration direction, followed by a strong backflush. The invention also relates to a programmed water-softening system with a treatment container to receive the exchange medium, a storage container receiving the regeneration medium, a central regulating valve comprising connections for untreated water, treated water and regeneration medium to the upper and lower areas of the treatment container, and a programmed control mechanism which triggers a regeneration process depending on the hardness of the untreated water and the extent of the exhaustion of the exchange medium, and which provides, for the purpose of regeneration, first the flow of the regeneration medium from bottom to top through the exchange medium, followed by a rinse with treated water in the same direction and a strong backflush.

BACKGROUND OF THE INVENTION

Methods similar to that described above and programmed water-softening systems are known (German Laid-Open Application No. 16 42 525 as well as published functional drawings of Clearmaster Company). In this known process the regeneration medium is passed through the exchange medium with a flow speed of 3 to 5 meters/hour. Normally, during the slow rinse process, the flow is generally at the same speed, because the rinse is accomplished by the injected water by means of which the regeneration medium is being suctioned and circulated. The subsequent backflush is done at a speed of about 8 meters/hour, which is intended to accomplish a mixing of the exchange medium as well as the freeing and floating off of accumulated fine materials. In addition, the exchange medium is supposed to be loosened up by means of the circulation of the regeneration medium.

Furthermore, later and improved methods are known, where the regeneration process is first begun with a strong back-rinse process with a flow direction through the exchange medium from below to above and where the regeneration medium is then passed through the exchange medium in the opposite direction, i.e. from above to below, and where the rinse is accomplished slowly in the same flow direction as the regeneration medium. Finally, there is a fast rinse process with a flow direction from above to below. During the treatment process the untreated water enters from above and flows through the exchange medium to the bottom.

Additionally it is known to utilize either a timed or a metered flow control system with programmed water-softening systems. In timed control systems the timed interval between two regeneration cycles is pre-selected. The actual treated water use, therefore, is not taken into consideration; accordingly, a surplus capacity of the exchange medium, possibly still present at the time of the start of the regeneration process, is lost. This method is inefficient as a rule, because an amount of regeneration medium equivalent to the regeneration of a completely exhausted exchange medium has to be used for every regeneration cycle. At the other extreme it is possible that the exchange medium may be already exhausted before the end of the pre-selected time period for the next regeneration, so that the possibility of unwanted water hardness exists.

In the case of a metered flow control system the regeneration is triggered by the drawing off of a pre-selected amount of treated water since the last regeneration, which can be arrived at mathematically by taking the capacity of the water-softening system and the hardness of the untreated water into account and inserting this into the program. Systems of this kind are technically expensive and lead to long intervals between two regenerations, if little or no treated water is used over long periods of time. This leads to severe contamination of the exchange medium, which has to be avoided in certain areas, such as the domestic or the food handling sectors. Additionally, regeneration cycles can be triggered undesirably at just the time when the demand for water is high.

SUMMARY OF THE INVENTION

It is, accordingly, an object of the invention to improve a method of the general kind cited above as well as a programmed water-softening apparatus of the type cited above in such a way that a hygienic operation in an efficient manner with the least possible environmental consequences is guaranteed at all times; other objects are to provide for improved water softening and to overcome deficiencies in the prior art, such as noted above.

The present invention accomplishes these objects by pre-setting, in a method of the above cited kind, a maximum time interval as well as a maximum degree of exhaustion of the exchange medium between two regenerations, so that in each regeneration only the amount of regeneration medium proportional to the degree of exhaustion is used and so that the regeneration medium is passed through the exchange medium at such a slow flow speed that the particle layers in the exchange medium remain virtually unchanged; and by including in a programmed water-softening apparatus of the previously mentioned type a programmed control mechanism which comprises a presettable timer mechanism set to the maximum time interval between two regenerations, a metering mechanism which can be set according to the hardness of the untreated water and which supplies for each regeneration an amount of regeneration medium proportional to the degree of exhaustion of the exchange medium, and a detent mechanism which lowers the flow speed of the regeneration medium through the exchange medium to the point where the particle layers in the exchange medium remain virtually unchanged.

It is important in this respect that a sufficiently slow flow speed of the regeneration medium from bottom to top through the exchange medium, in the backflow direction, i.e. countercurrent to the softening direction of flow, be achieved and maintained. The flow speed will have to be low enough so that the individual particles of the exchange medium hardly change their positions relative to one another, i.e. neighboring thin layers of the exchange medium do not become intermixed. Since the untreated water during the softening stage enters the exchange medium from above and is led off at the bottom, the exchange medium becomes exhausted first in the upper boundary layers and the exhausted mass of the exchange medium slowly grows from the top to the bottom of the bed, with a definite separation layer towards the still active part of the exchange medium.

At the slow flow speed of the regeneration medium defined above during the start of the regeneration stage, the regeneration medium displaces the still present water in the exchange medium, without mixing with it and becoming diluted. The regeneration medium therefore reaches the upper layer of the exhausted part of the exchange medium undiluted, i.e. at optimal concentration, and can therefore regenerate it completely while passing through it. Thus the present invention makes possible the utilization of only that amount of regeneration medium proportional to the exhaustion of the exchange medium.

A number of definite advantages result from this. It becomes possible to combine a timer and a metered flow regulator and thereby to satisfy the sanitary demands to their full extent by use of proportionally short time intervals, while at the same time the environment is taxed with only the smallest possible amount of regeneration solution. During every regeneration cycle only as much regeneration medium is used as corresponds to the capacity of the exchange medium.

In this regard it is also important that—in contrast to the state of the art of effective and santiary water-softener systems—the regeneration process is not started with a backflush cycle, but that first the regeneration medium is gently passed through the exchange medium in the manner defined in the present invention. The strong backflush only takes place, according to the present invention, only toward the end of the regeneration stage. Thus, the flow speed of the regeneration medium through the exchange medium is preferably held to 1 meter/hour or less, which normally leads to laminar flow.

According to an advantageous embodiment of the present invention, during each withdrawal of treated water an amount of treated water, to be used as solvent for the preparation of the regeneration medium, is taken from the treated water line and the regeneration medium in solution is kept ready. For this a piston pump with a three-way valve is preferably employed, in which the piston has been initially biased by a spring in a direction opposite to the inflow direction. The programmed control mechanism actuated by a flow meter then, each time it receives an impulse from the flow counter, connects the three-way valve between the treated water line and the piston pump and then switches it after a predetermined interval and connects the piston pump with the storage container for the regeneration medium. Since the stroke of the piston can be regulated in relation to the hardness of the untreated water, a predetermined amount of treated water to be used as solvent is brought to the storage container for the regeneration medium with each impulse of the flow meter, which is proportional not only to the hardness of the water but also to the amount of treated water used.

Finally, in another embodiment, provision is made for a metering pump with a suction valve and a pressure valve for water softening chemicals, which can be coupled with the piston pump, and the metering piston of which can be actuated by the piston of the piston pump. Here, advantageously, the cover supporting the spring can be provided so that it is removable from the piston pump, while the metering pump has a coupling member which can be screwed into the piston pump instead of the cover. Preferably, the metering pump is equipped with a metering piston which has been biased by a spring against a fixed end stop and which, during the stroke of the piston of the piston pump against its second end stop is brought against its own second end stop. Such a metering pump then dispenses a fixed amount of water softening chemicals into the treated water line every time the metering counter generates an impulse. The water softening chemicals, therefore, are metered proportionally to the amount of treated water used, independent from the degree of hardness of the water the piston pump has been set for.

Further embodiments of the method according to the present invention and the water softening apparatus according to the present invention will be apparent to those skilled in the art in view of the present disclosure, and such embodiments are intended to be comprehended within the scope of the invention.

BRIEF DESCRIPTION OF THE DRAWINGS

Other objects and the nature and advantages of the instant invention will be apparent from the following description of certain preferred embodiments which are described below by means of the drawings, and regarding which:

FIG. 2 is an alternate embodiment, where the metering member includes a metering counter;

FIG. 3 is an embodiment of the piston pump in cut-away view;

FIG. 4 is an embodiment of a metering pump in cut-away view, which has been screwed to a piston pump according to FIG. 3;

DETAILED DESCRIPTION OF PREFERRED EMBODIMENTS

Figure 1:
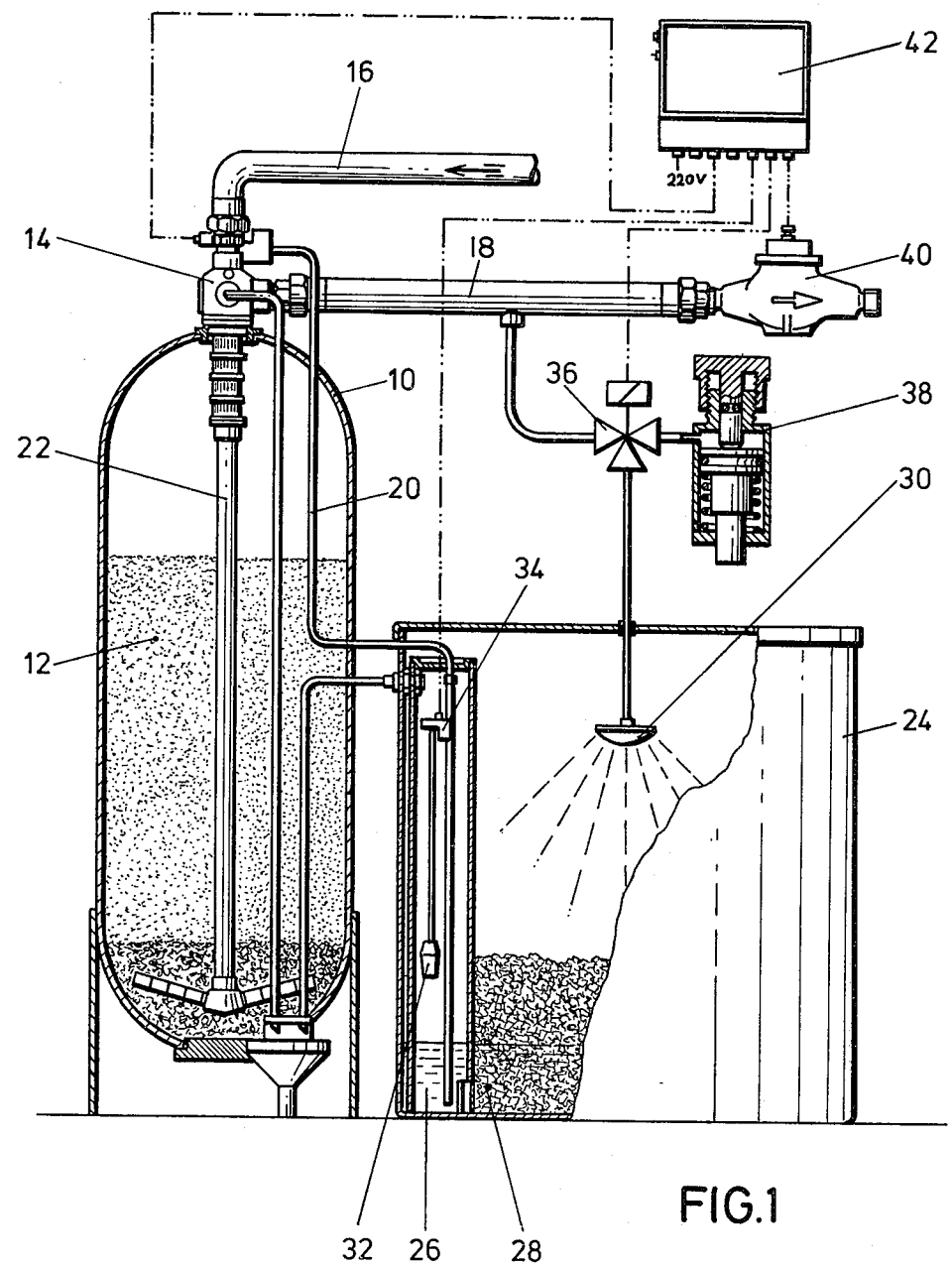
FIG. 1 is a schematic drawing of a water softening apparatus, where a pressure container for the exchange medium is shown in cut-away view, a regeneration storage container is shown in partially cut-away view, and a programmed control mechanism arrangement is shown as a block schematic.

According to FIG. 1, a water-softening apparatus comprises a pressure container 10 as a water softening or treatment container, and in which is contained an exchange medium 12 for water softening. A central regulating valve 14, disposed of known construction and incorporating a detent, is at the top of the pressure container 10, and comprises connections for an untreated water inlet line 16, a treated water outlet line 18, a regeneration medium line 20, an access (not shown) to the upper region of the pressure container 10 and a connecting line 22 to the lower region of the pressure container 10.

In addition, the water softening apparatus comprises a storage container 24 for an exchanger regenerating medium 26. The regenerating medium 26 is a solution of a regenerating salt 28, also stored in the storage container 24, with water, which emerges from a spray head 30 disposed in the storage container 24, as a solvent.

The storage container 24 also contains a height indicator having a float 32 and a switch 34.

The spray head 30 is connected by a line with a connection of a three-way magnetic valve 36. The second connection of the three-way valve 36 is connected with a branch line of the treated water line 18. The third connection of the three-way valve 36 leads to a piston pump 38. Also inserted into the treated water line 18 is a metering counter 40 which can operate according to the impulse technique as described in the German Laid-Open Application DE-AS No. 23 00 606 (also British Pat. No. 1450222). A programmed control mechanism 42 is connected by electrical circuits with the metering counter 40, the three-way magnetic valve 36, the switch 34 of the height indicator and the central regulating valve 14.

The piston pump 38, depicted in FIG. 3, contains a piston 50 which is biased in the end position against an end stop 54 by means of a coil spring 52. Another end stop 57 is disposed on the same side of the piston 50 as the coil spring 52. The first end stop 54 can be adjusted in the direction of the stroke of the piston by means of a fine adjustment 56, depicted as a micrometer screw. An opening for a connection 58 leads into the interior of the cylinder of the piston pump 38 on the side of the cylinder 50 away from the coil spring 52.

According to FIG. 4, a metering pump 62 is provided with a coupling member 84 embodied with an external thread for screw attachment to the housing of piston pump 38. For this purpose, the housing of the piston pump 38 is equipped on its front end with a cover 82, which supports the coil spring 52 and carries the second end stop 57 and which can be unscrewed from the housing of the piston pump 38. The metering pump 62 with its coupling member 84 is screwed to the housing of the piston pump 38 at this place. Upon such attachment, the coupling member 84 supports the coil spring 52 of the piston pump 38; and the second end stop in the piston pump 38 is provided by a second end stop 88 of the metering pump 62, in which a metering piston 60 is movably disposed, which is biased against a third end stop 86 in the form of a snap ring by means of a coil spring 80. The metering piston 60 is provided, at its end protruding into the piston pump 38, with a widened head piece, on which the coil spring 80 is supported. The coil spring 80 is disposed coaxially within the coil spring 52 of the piston pump 38 when the metering pump 62 is screwed to the piston pump 38. In addition, the snap ring 86, disposed on the metering piston 60, butts against the front end of the guide bore of the metering piston 60 opposite from the widened head piece of the metering piston 60.

The following will describe in principle the functioning of such a water softening apparatus. During normal operations when only treated water is withdrawn, the central regulating valve 14 is switched so that untreated water flows out of the untreated water inlet line 16 by means of a connection (not shown) of the central regulating valve 14 into the upper part of the pressure container 10, then flows through the exchange medium 12 and, in the lower part of the pressure container 10, flows into the connecting line 22 and from there to the treated water exit line 18.

At every withdrawal of treated water, the metering counter 40 sends impulses to the programmed control mechanism 42, the amount of which is proportional to the amount of treated water withdrawn. As soon as an impulse arrives at the programmed control mechanism 42, the latter directs a control impulse to the three-way regulating valve 36, which then makes the connection from the treated water line 18 to the piston pump 38. Some treated water from treated water line 18 is thus forced into the interior of the piston pump 38. The bias of coil spring 52 in piston pump 38 has been selected in such a manner that the piston 50, upon admission of the fluid, is pushed to the second end stop 57 because of the pressure of the treated water line 18. After a preselected time programmed into the programmed control mechanism, the control impulse at the three-way magnetic valve 36 is removed and the latter now switches and connects the piston pump 38 with the spray head 30 in storage container 24. Piston 50 is then pushed back to the first end stop by the coil spring 52 and an amount of the treated water, compressed in the piston pump corresponding to the amount contained in this stroke, is expelled and is sprayed over the regenerating salt 28 by the spray head 30.

During the following impulse of the metering counter 40, the programmed control mechanism 42 again sends a control impulse to the three-way magnetic valve 36 and again the same amount of treated water corresponding to the stroke of piston 40 is brought to the storage container 24. The time needed by the piston pump 38 to take in and discharge treated water is shorter than the shortest time interval between two sucessive impulses of metering counter 40. In this manner an amount of regeneration solvent equivalent to the amount withdrawn and the hardness of the untreated water is manufactured during each withdrawal of treated water and is stored in the storage container 24.

In the event that the metering pump 62 is screwed to the piston pump 38, the piston pump 38 continues to work without change, in the manner described above. In the state of rest of the piston pump 38, the metering piston 60 is biased in the end placement by means of its coil spring 80, where the metering piston 60 is displaced towards the piston 50 of the piston pump 38. When the piston pump 38 is connected with the treated water line and the piston 50 is displaced towards the second end stop, it rests against the widened head piece of piston 60 and moves it further towards its second end stop 88. As soon as piston 50 pushes the treated water out of piston pump 38 again, the coil spring 80 pushes the metering piston 60 back to the first end stop.

While the stroke of piston 50 of piston pump 38 can be regulated by means of the fine adjustment screw 56 between a minimal stroke a and a maximum stroke b, metering piston 60 takes a constant stroke c regulated by the two end stops of the metering piston 60. Every time the metering piston 60 is displaced by the piston 50 of the piston pump 38 against the resistance of its coil spring 80, it pushes a defined amount of water softening chemicals by way of a discharge line equipped with a pressure valve 66 into the treated water line. Then when the coil spring 80 pushes the metering piston 60 against the first end stop, pressure valve 66 is closed and a new defined amount of water softening chemicals is piped in by means of a suction valve 64 disposed at an entrance to the chemical discharge line. The amount of water softening chemicals injected into the treated water line with each stroke therefore is independent on the hardness of the treated water and the corresponding fine adjustment 56 of piston pump 38.

A regeneration cycle can be triggered in two different ways, namely by means of a timing member provided in the programmed control mechanism (and not shown), or by means of the height indicator with its float 32 and switch 34. With the aid of the timer member a maximum time interval between two regenerations depending on the prevailing operating conditions can be pre-selected. If within this maximally allowable time the capacity of the exchange medium 12 has only been partially exhausted, the regeneration cycle will be triggered by the timer member. If, on the other hand, the withdrawal of treated water is high enough so that the exchange medium 12 is entirely or almost entirely exhausted before reaching the pre-selected maximal timed interval, the regeneration medium 26 in the storage container 24 reaches a height sufficient to cause the raised float 32 to trigger the switch 34 and start a regeneration cycle.

An important aspect is seen in the fact that an amount of regeneration medium 26 is always held ready in the storage container 24 proportional to the degree of exhaustion of the exchange medium 12 and to the hardness of the untreated water to be softened. During every regeneration cycle, therefore, only as much regneration medium 26 is passed through the exchange medium 12 as is necessary for the regeneration of the exhausted medium. Such a regeneration, however, can only be accomplished with a good degree of effectiveness as long as the steps according to the present invention are observed.

The regeneration process must begin with the flow-through of the regeneration medium from the bottom to the top of the exchange medium 12 with such slow speed that the several particles in the exchange layers do not noticably change their positions to one another, in which case the injected regeneration solution, diluted with injected water, does not lose its concentration, because no substantial admixture of the regeneration solution with the water slowly displaced towards the top between the individual particles takes place. This leads to the result that the zone of the exhausted medium, extending from above to below in the exchange medium, is contacted by the regeneration solution in optimal concentration and is diffused and regenerated to an optimal degree. Afterwards, the freed ions are discarded directly by way of the connection (not shown) of the upper part of the pressure container 10 and the central control valve and then into the sewer system without contacting the remaining exchange active medium.

Regeneration medium 26 is drawn out of storage container 24 by means of an injector in the form of a jet pump disposed in central control valve 14 and is then brought by means of the connecting line 22 into the lower zone of the exchange medium 12. The flow rate is controlled in conjunction with the detent element of the valve 14. As soon as the amount of regeneration medium 26 stored in storage container 24 before every regeneration has been used up, softened water for rinsing continues to flow through the injector and the connecting line 22 until all the ion contaminated regeneration solution thus diluted has been completely displaced out of the exchange medium and the free space above it. Next, a strong backflush process in the same direction of flow commences which leads to a mixing of the mass and to a separation and floating-off of stored fine materials.

In the alternate embodiment of a water softening apparatus schematically depicted in FIG. 2, a two-way magnet valve 70 in connection with a flow stabilizer 72 is provided instead of the piston pump 38. As soon as the metering counter 40 sends an impulse to the programmed control mechanism 42, the latter activates the two-way magnetic valve 70 by means of an impulse and opens it for a length of time proportional to the hardness of the untreated water to be softened. Alternately a storage element can be disposed in the programmed control mechanism 42 which stores the impulses given off by metering counter 40 until such a time when either the timing member triggers a regeneration cycle or a number of impulses has been reached equivalent to the exhaustion of the exchange medium in relation to the hardness of the untreated water to be treated. In this alternate case the programmed control mechanism 42 sends an impulse to the two-way magnetic valve 70 before the start of the regeneration cycle the length of which is proportional to the total number of impulses sent by metering counter 40 since the last regeneration, so that an amount of solution proportional to the amount of treated water used is replaced in the storage container 24 or a proportional amount of concentrated regeneration medium is added prior to the start of the regeneration.

Figure 5:
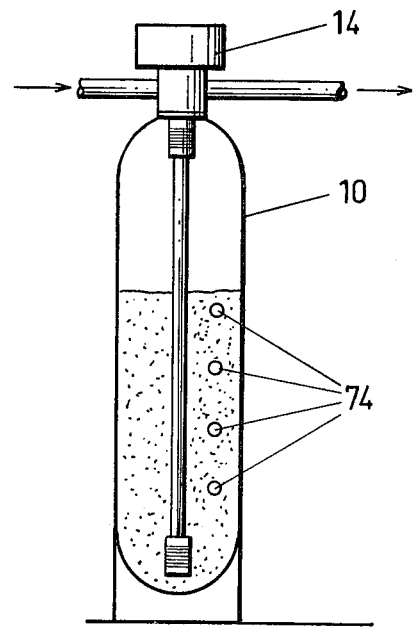
FIG. 5 is an entirely schematic view of a pressure container with exchange medium and sensors for the definition of the separation layer between active exchange medium and exhausted medium.
Figure 6:
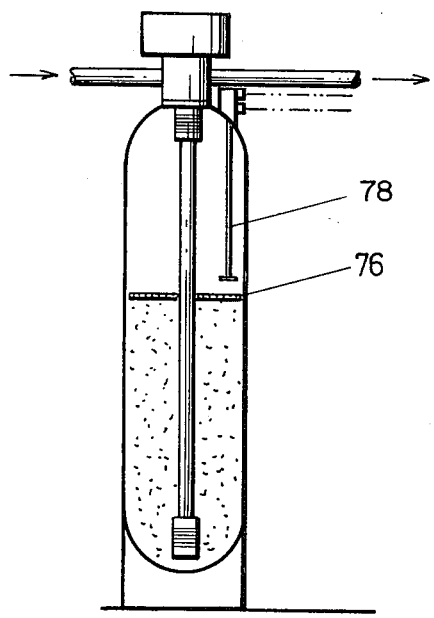
FIG. 6 is an entirely schematic view of a pressure container with a measuring arrangement for the determination of the upper boundary of the upper separation layer of the exchange medium.

FIGS. 5 and 6 show two other embodiments which control the ongoing exhaustion of the exchange medium. According to FIG. 5, sensors 74 are disposed in pressure container 10 in predetermined distances from the bottom to the top, which allow a continuous determination of the position of the boundary layer between the exhausted and the still exchange-active medium within the exchange medium. When a regeneration cycle is triggered, there is or will be provided sufficient regeneration medium to correspond to the height of this boundary layer. In the embodiment according to FIG. 6, a porous float is placed on top of the exchange medium. Additionally, a metering arrangement 78 is provided which can determine the height of float 76 which varies during the exhaustion of the exchange mass, since the latter changes its volume during the charging with Ca and Mg ions.

It will be obvious to those skilled in the art that various changes may be made without departing from the scope of the invention and the invention is not considered limited to what is shown in the drawings and described in the specification.

What is claimed is:

1. In a method for a cyclic regeneration of a water softening system, which comprises an exchange medium in a treatment container and a regeneration medium in a storage container, comprising:
    first passing a regeneration medium from the bottom through the exchange medium to the top thereof in a direction counter-current to the flow of water during the softening cycle, then slowly flushing the exchange medium with treated water in the same direction of flow, and then strongly flushing in the same direction, the improvement wherein
    (1) a maximum time interval and a maximum degree of exhaustion of the exchange medium between regenerations are preselected and monitored as limit values;
    (2) each regeneration is initiated by the one of said two limit values which is reached first;

(3) in each regeneration cycle only the amount of regeneration medium proportional to the degree of exhaustion is used; and (4) the regeneration medium is diffused through the exchange medium at such a low flow velocity that the particle layers in the exchange medium remain substantially unchanged.

2. Method in accordance with claim 1, wherein the flow velocity of the regeneration medium through the exchange medium is smaller than or no more than 1 meter/hour.

3. Method according to claim 1, wherein the flow of the regeneration medium in the exchange medium is laminar.

4. Method according to claim 1, wherein the degree of exhaustion of the exchange medium is determined indirectly by measuring the amount of treated water used.

5. Method in accordance with claim 1, wherein the maximum degree of exhaustion is indirectly determined by the amount of regeneration medium stored since the last regeneration.

6. Method according to one of claims 4 or 5, wherein during each withdrawal of untreated water, an amount of regeneration medium proportionate to the hardness of the untreated water and the amount of treated water withdrawn is put into solution and stored.

7. Method according to one of claims 4 or 5, wherein a measured value proportional to the hardness of the untreated water and the amount of treated water withdrawn is stored during each softened water withdrawal and at the time of the next regeneration an amount of regeneration medium proportional to the sum of the measured values is fed to the exchange medium.

8. Method according to claim 1, wherein the degree of exhaustion is determined by monitoring the position of the boundary layer between the exchange-active and the exhausted medium of the exchange medium in the treatment container and an amount of regeneration medium proportional to said position fed to the exchange medium.

9. Method according to claim 1, wherein the degree of exhaustion is determined by measuring the height of the upper boundary layer of the exchange medium in the treatment container and an amount of regeneration medium proportional thereto is fed to the exchange medium.

10. In a programmed water softening system having a treatment container containing an exchange medium; a storage container containing a regeneration medium; a central regulating valve having connections for an untreated water inlet, a treated water outlet means to feed regeneration medium to the region of the treatment container, and means to remove contaminated liquids from the upper region of the treatment container; and a programmed control means to trigger a regeneration cycle dependent upon the hardness of the untreated water and the degree of exhaustion of the exchange medium and which, for the purposes of regeneration, permits first the flow of regeneration medium from the bottom to the top through the exchange medium, then a rinse with treated water in the same direction of flow and finally a strong flush in the same direction, the improvement wherein:

the programmed control means includes a timer member preset to a maximum time interval between two regenerations, an additional metering means adjustable to the degree of hardness of the untreated water and to make available for each regeneration an amount of regeneration medium proportional to the degree of exhaustion of the exchange medium, and a control element to control the flow speed of the regeneration medium through the exchange medium to such a degree that the particle layers in the exchange medium remain substantially undisturbed, and wherein said programmed control means further comprises means to trigger a regeneration cycle when the first of two limit values is reached, one of said limit values corresponding to said degree of exhaustion of the exchange medium, and the other of said limit values corresponding to said maximum time interval.

11. System according to claim 10, wherein the additional metering means comprises a piston pump for the passage of solvent water to the storage container, said piston pump including a piston.

12. System according to claim 11, further comprising means to adjust the stroke of said piston of the piston pump to compensate for varying degrees of hardness of the untreated water.

13. System according to claim 12, wherein an end stop extends into the cylinder of piston pump which is adjustable to permit changing of the stroke of the piston in the direction of the stroke.

14. System in accordance with claim 11, wherein a multi-direction valve is inserted into a branch line of said treated water outlet, one exit of said valve being connected with the piston pump and the other exit of which constitutes a line to said storage container, said valve being regulated by said programmed control means upon receipt of an impulse triggered by the withdrawal of treated water first to connect said piston pump and treated water line and, a predetermined time later, to connect said piston pump and storage container.

15. System according to claim 14, wherein said piston of said piston pump is biased by a spring in such a way that it forces the treated water contained in the piston pump into the storage container, after said multi-direction valve has been switched.

16. System in accordance with claim 11, further comprising a metering pump having a metering piston, a suction valve and a pressure valve, said metering pump being coupled with said piston pump, said metering piston being activated by said piston of said piston pump.

17. System in accordance with claim 16, wherein a cover, supporting a coil spring, is unscrewable from said piston pump, and said metering pump has a coupling member screwed onto said piston pump in place of said cover.

18. System in accordance with claim 16, wherein said metering piston is biased by a coil spring against a fixed end stop (86), and which moves against its own second end stop (88) during the stroke of piston (50) of piston pump (38) against its second end stop (57).

19. System in accordance with claim 10, further comprising a height indicator in said storage container, and which triggers a regeneration cycle once a maximum predetermined height of the regeneration medium has been reached.

20. System in accordance with claim 10, wherein said additional metering member comprises a metering counter inserted into the treated water outlet and which sends signals proportional to the sum of the partial amounts of treated water withdrawn since the last regeneration to said programmed control means, and which activates an additional metering valve for adding solvent water to said storage container depending on the signals and the hardness of the untreated water.

21. System in accordance with claim 10, wherein said additional metering means comprises sensors for monitoring the position of the boundary layer between the exchange-active medium and the exhausted exchange medium.

22. System according to claim 10, wherein said additional metering means comprises means to measure the height of the exchange-active medium in storage container.

23. A water softening system comprising:
an exchange medium in a treatment container and a regeneration medium in a storage container;
means for first passing a regeneration medium from the bottom through the exchange medium to the top thereof in a direction counter-current to the flow of water during the softening cycle, then slowly flushing the exchange medium with treated water in the same direction of flow, and then strongly flushing in the same direction; and
means for preselecting and for monitoring as limit values a maximum time interval and a maximum degree of exhaustion of the exchange medium between two regenerations; means for initiating a regeneration cycle when the first of said two limit values is reached; means for using in each regeneration cycle only the amount of regeneration medium proportional to the degree of exhaustion; and
means for diffusing the regeneration medium through the exchange medium at such a low velocity that the particle layers in the exchange medium remain substantially unchanged.

* * * * *